May 6, 1969
E. C. MERSEREAU
3,442,358
BRAKE MECHANISM
Filed Feb. 23, 1968
Sheet 1 of 6
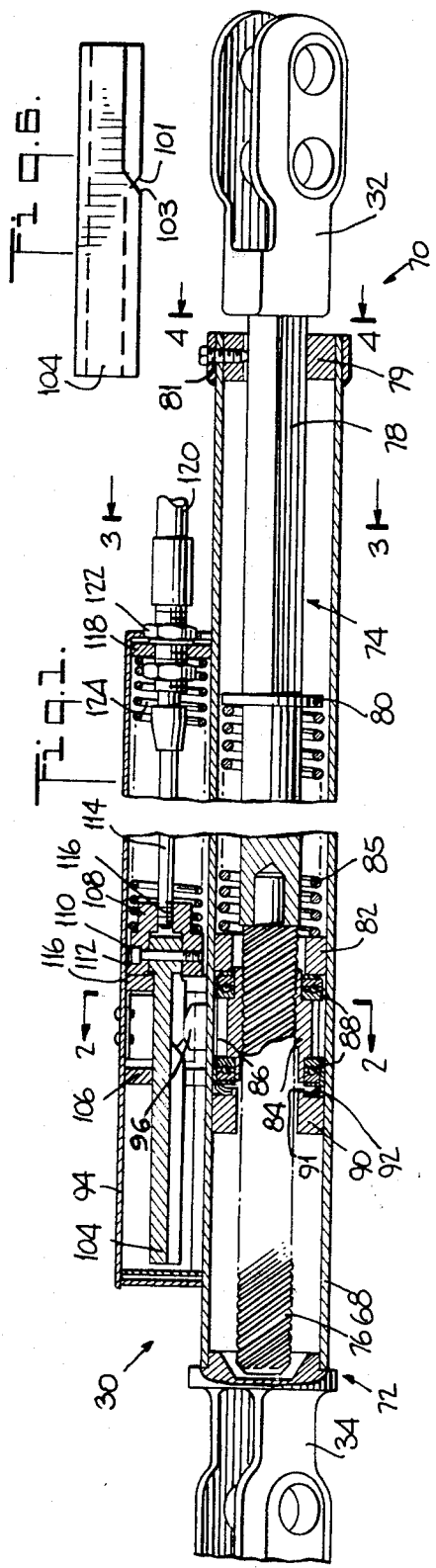
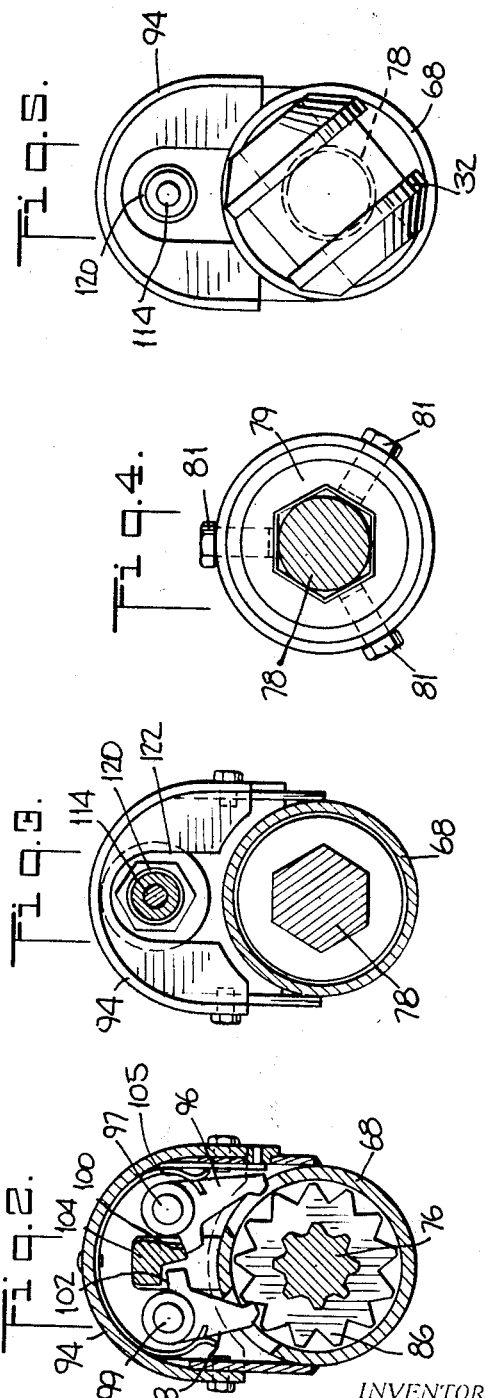
INVENTOR.
EVERARD C. MERSEREAU
BY
Ward, Haselton, McElhenny, Books & Fitzpatrick
ATTORNEYS

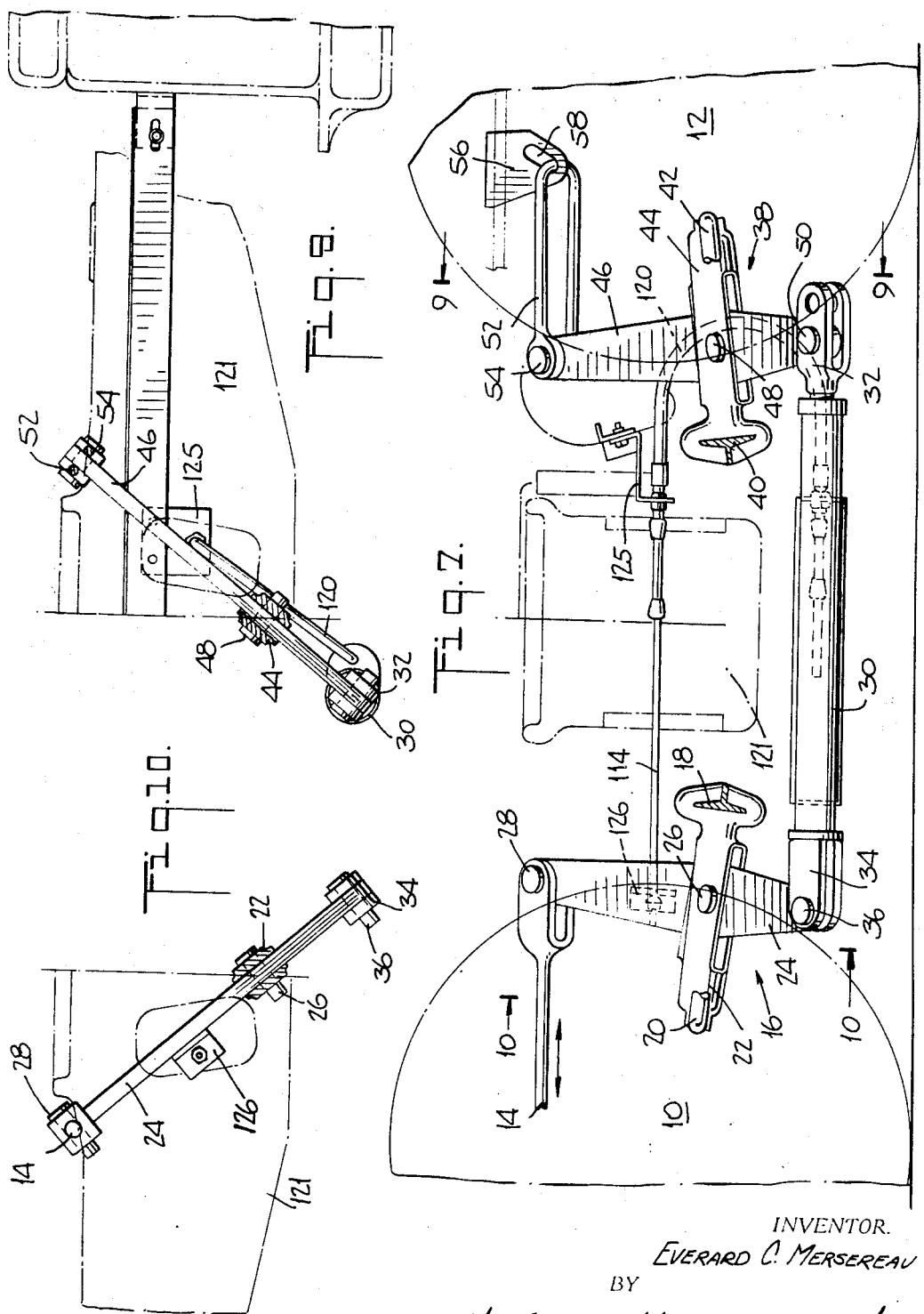

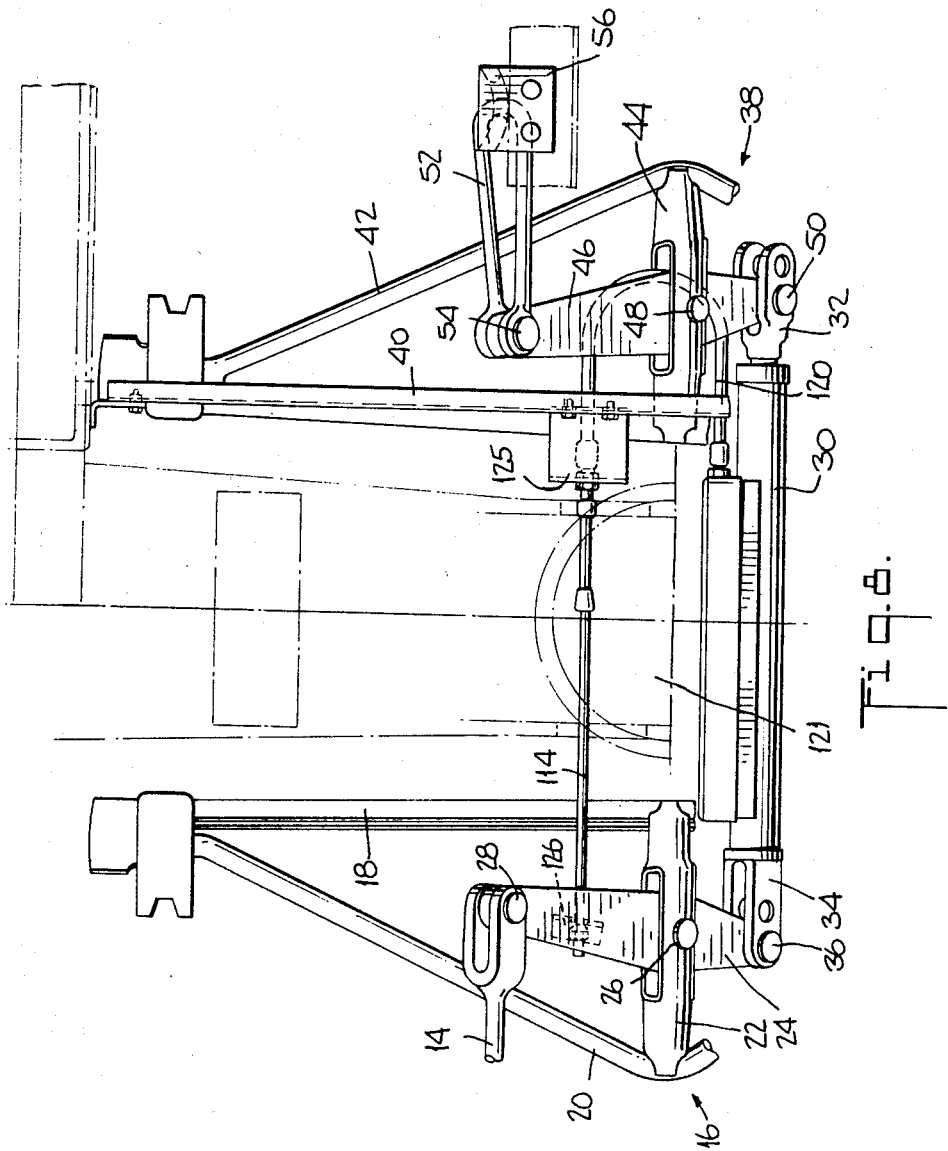

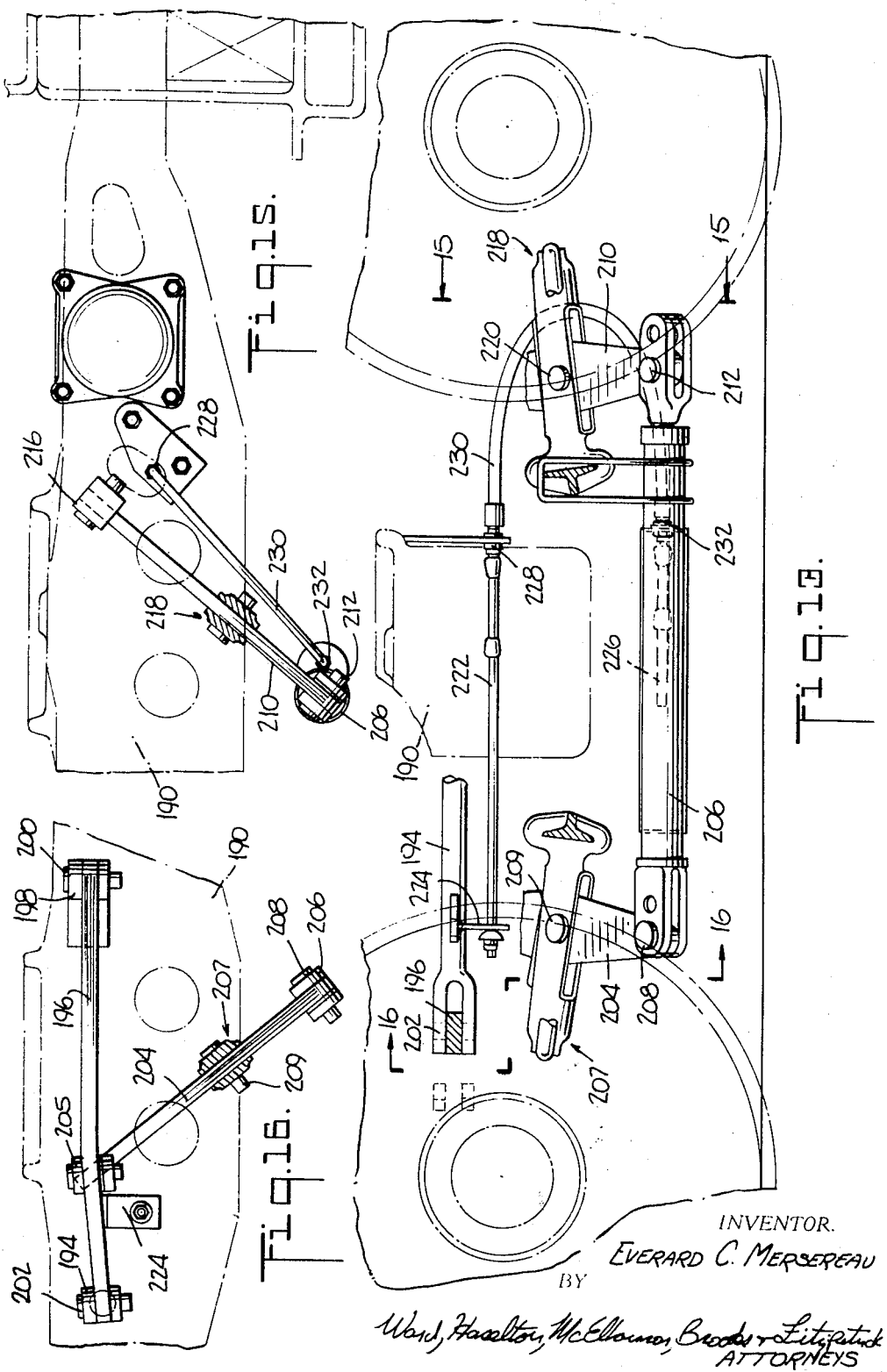

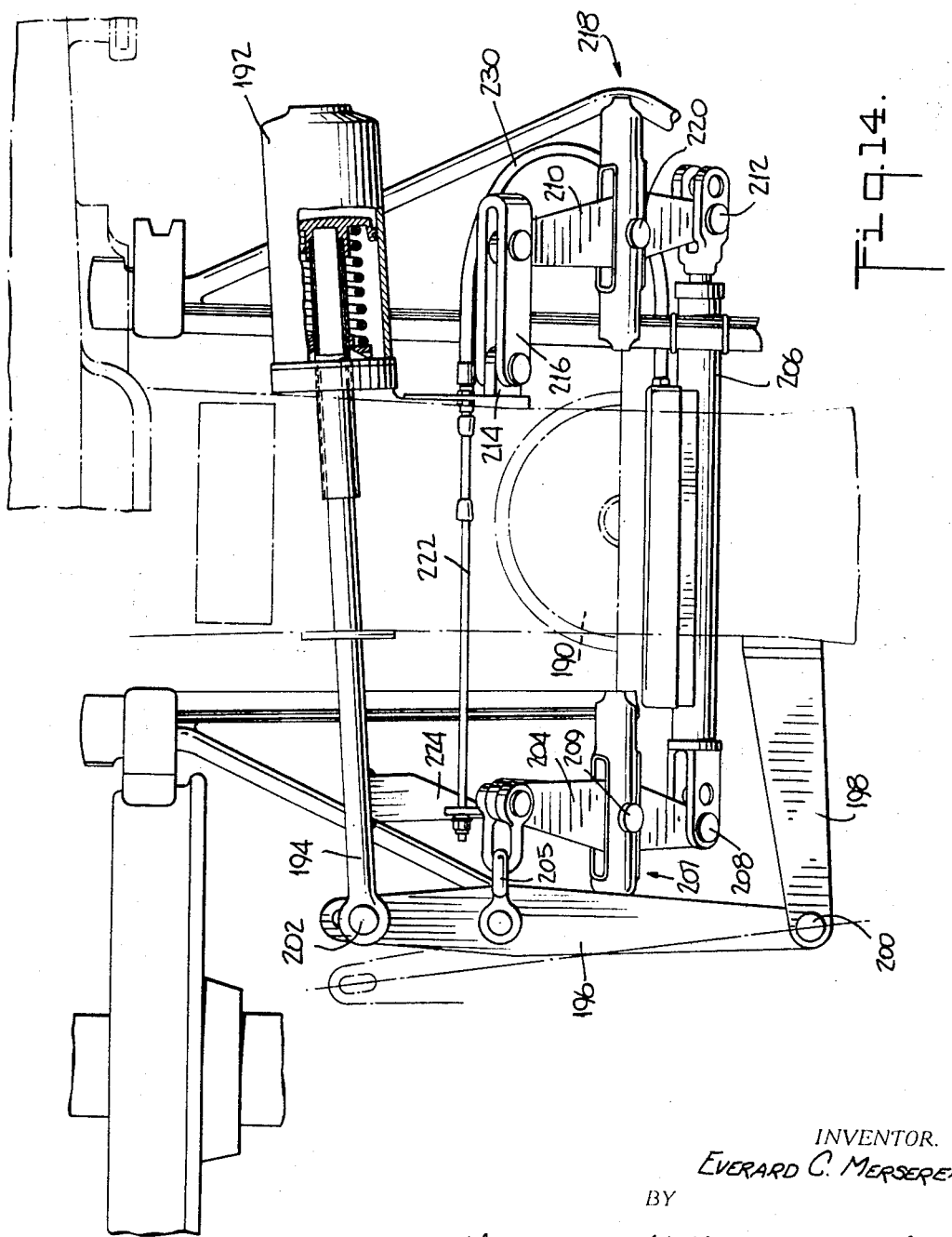

United States Patent Office 3,442,358
Patented May 6, 1969

3,442,358
BRAKE MECHANISM
Everard C. Mersereau, Wayne, N.J., assignor to Ellcon-National, Inc., Totowa Borough, N.J., a corporation of New York
Continuation-in-part of application Ser. No. 577,481, Sept. 6, 1966. This application Feb. 23, 1968, Ser. No. 707,610
Int. Cl. F16d 65/56; B61h 13/00
U.S. Cl. 188—202     10 Claims

ABSTRACT OF THE DISCLOSURE

A fluid actuated railway car brake mechanism including in combination, a brake beam having portions which are frictionally engageable with the wheels, a truck lever pivotally mounted on the brake beam, slack adjusting means connected to one end of the truck lever, and trigger means interconnecting the truck lever and the slack adjusting means for actuating the slack adjusting means in response to movement of the truck lever.

---

This application is a continuation-in-part of copending application Ser. No. 577,481 entitled "Brake Mechanism," filed Sept. 6, 1966, now Patent No. 3,406,794.

This invention has to do with brake mechanisms, and more particularly, double acting brake mechanisms for standard railway cars.

The brake mechanism according to this invention is particularly adapted for use in all standard railway car trucks such as are now widely in use on American, Mexican and Canadian railways. The brake mechanism according to this invention may be used as new or original equipment on the railway cars, or it may be used as replacements or attachments to brake mechanisms presently in operation.

In brief, the present invention comprises the provision of a brake mechanism for a railway car having a body and a truck carrying a pair of wheels, which mechanism comprises a brake beam having portions which are selectively brought into frictional engagement with the pair of wheels, and a truck lever medially pivotally mounted on the brake beam. Slack adjusting means are employed which are extensible and retractable for eliminating the slack and controlling the travel of the brake mechanism, said slack adjusting means being lockable in a rigid condition when transmitting the full braking force to the brake beam. One end of the truck lever is pivotally connected to the slack adjusting means; an air actuated piston-cylinder assembly is attached to the car body towards the center thereof and is connected by a system of levers and rods to an actuating rod which is pivotally attached to the other end of the truck lever. The mechanism further comprises trigger means interconnecting the truck lever and the slack adjusting means for actuating said slack adjusting means in response to movement of the truck lever.

In one form of the invention, the brake mechanism for the railway car includes a frame member, a truck carrying a pair of wheels, a piston cylinder assembly mounted on the frame member, the piston rod actuated by the piston cylinder assembly. A first lever is provided having one end pivotally mounted on the frame member and the other end thereof pivotally mounted on the piston rod. A brake beam is employed having portions which are selectively brought into frictional engagement with a pair of wheels, and a truck lever medially pivotally mounted on the brake beam. Slack adjusting means are employed which are extensible and retractable for limiting the slack and controlling the travel of the brake mechanism, said slack adjusting means being lockable in a rigid condition when transmitting the full braking force to the brake beam. One end of the truck lever is pivotally connected to the slack adjusting means and the other end of the truck lever is connected to a medial portion of said first lever by shackle means. The brake mechanism also comprises trigger means for connecting the piston rod and the slack adjusting means for actuating said slack adjusting means in response to movement of the piston rod.

In another form of the invention, the slack adjusting device comprises a housing having first and second ends, a push rod assembly having a threaded portion and having a circumferential shoulder. An adjusting nut is provided threadably mounted on the threaded portion of the push rod and has teeth on the circumference thereof. Bearing means including bearing retainers are provided for mounting the adjusting nut within the housing for rotation. A spring is disposed within the housing and acts between the circumferential shoulder and the bearing retainer means. The adjusting nut engages the bearing retainer means when an axial force is applied to the slack adjusting means and it is in its rigid condition. A load pawl and a holding pawl are mounted in the housing adjacent the teeth and engageable respectively with opposite sides of the teeth for respectively preventing movement of the rod assembly in opposite directions. It will be appreciated that a cam bar is provided and a cam bar hub is connected to the cam bar, the cam bar hub having a circumferential shoulder. A trigger cable is threadably connected to the cam bar hub and the cable extends through an opening in the end of the housing. The cable is adapted for longitudinal movement with respect to the housing. The cam bar is U-shaped and the end of the arms are cam surfaces, respectively. These surfaces are engageable with the pawl cam engaging portions, respectively, for disengaging the teeth engaging portions of the pawls from said teeth. The cam surfaces and the cam engaging portions are disposed with respect to said pawls so that in a first longitudinal position of the cam bar the load pawl is out of engagement with the teeth and the holding pawl is in engagement with one of the teeth, and in a second longitudinal position of the cam bar the load pawl is in engagement with one of the teeth and the holding pawl is out of engagement with the teeth. Further, spring means are provided in the housing acting between the circumferential shoulder of the cam bar hub and an end flange in the housing for urging the cam bar away from the first end of the housing.

In still another form of the invention, the new and improved braking mechanism includes a piston rod having a yoke on the end thereof. The yoke is provided with a pair of spaced arms opening in a first direction. A U-shaped member having a pair of spaced fingers and opening in the same direction is mounted between the arms of the yoke. First pin means are provided which serve to pivotally connect the arms and the fingers, and second pin means serve to pivotally interconnect one end of a lever between the fingers of the U-shaped member.

It is an aim of the present invention to provide a new and improved brake mechanism which is reliable, compact, low in weight, convenient, durable, practical, safe in operation and economical.

Other objects and advantages reside in the details of construction and operation, as more fully hereinafter described and claimed, reference being had to the accompanying drawings forming part hereof, wherein like numerals refer to like parts throughout, and in which:

FIG. 1 is a medial sectional view showing details of the slack adjuster constructed according to this invention;

FIG. 2 is a transverse sectional view taken along the line 2—2 of FIG. 1;

FIG. 3 is a transverse sectional view taken along the line 3—3 of FIG. 1;

FIG. 4 is a transverse sectional view taken along the line 4—4 of FIG. 1;

FIG. 5 is an end view of the slack adjuster of the invention;

FIG. 6 is a detailed longitudinal enlarged view of the cam bar showing the cam surfaces;

FIG. 7 is a side elevation, drawn on a reduced scale, of the brake mechanism of the invention and applied to a railway car truck;

FIG. 8 is a fragmentary plan view of the brake mechanism of FIG. 7;

FIG. 9 is a fragmentary vertical sectional view taken along the line 9—9 of FIG. 7;

FIG. 10 is a fragmentary vertical sectional view taken along the line 10—10 of FIG. 7;

FIG. 13 is a side elevation, drawn to a reduced scale, of still another embodiment of the brake mechanism of this invention;

FIG. 14 is a fragmentary plan view of the embodiment of the invention of FIG. 13;

FIG. 15 is a fragmentary vertical sectional view taken along the line 15—15 of FIG. 13; and FIG. 16 is a fragmentary vertical sectional view taken along the line 16—16 of FIG. 13.

Figure 11:
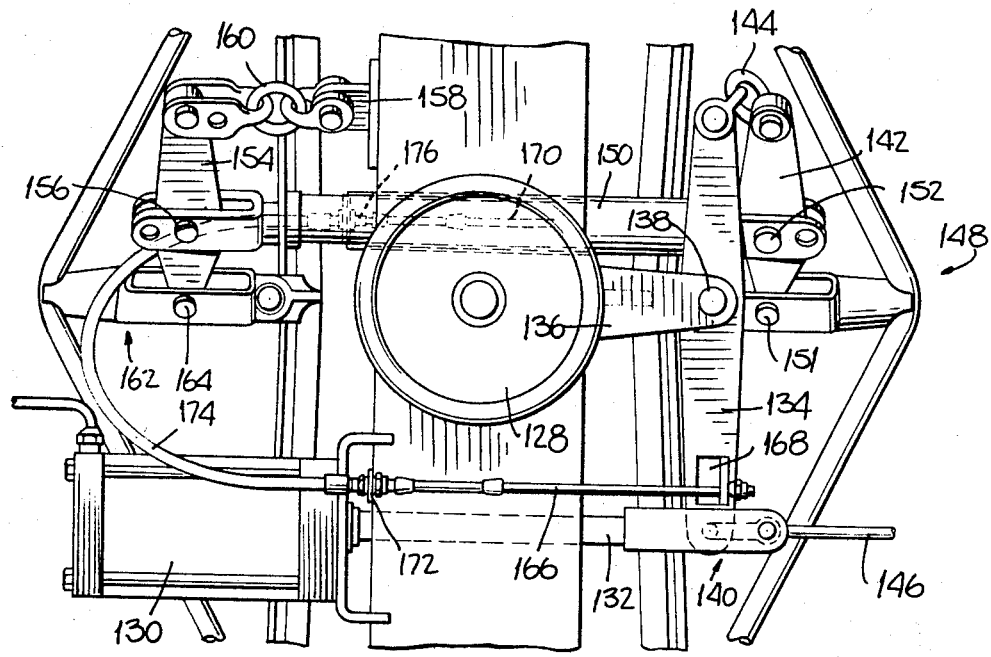
FIG. 11 is a fragmentary plan view of another embodiment of the brake mechanism of this invention.

In the embodiment of the invention illustrated in FIGS. 7–10, the mechanism comprises a first pair of wheels 10, and a second pair of wheels 12, respectively, only one wheel of each pair being shown in FIG. 7, the other wheel of each pair being identical. An air actuated piston-cylinder assembly (not shown) is attached to the car body towards the center thereof, and is connected by a system of levers and rods (not shown) to an actuating rod 14. A first truck beam indicated generally at 16 has a brake beam cross member 18, a pair of arms 20, and a medial strut 22. For braking purposes, portions of the brake beam are selectively brought into frictional engagement with the first pair of wheels in a conventional manner. A truck live lever 24 is centrally pivotally mounted on the medial strut 22 of the brake beam as at 26. For purposes of actuating a truck live lever 24, the actuating rod 14 is pivotally connected thereto as by means of pin 28, provided for the purpose.

As best seen in FIGS. 7 and 8, slack adjusting means 30 are extensible and retractable for eliminating the slack and controlling the travel of the brake mechanism, the slack adjusting means being lockable in a rigid condition when transmitting the full braking force between the brake beams. The slack adjuster 30 is provided with a yoke 32 at the first end thereof and a yoke 34 at the second end thereof. One end of the truck live lever 24 is pivotally connected to the second end of the slack adjusting means as by means of pin 36.

A second brake beam, indicated generally at 38, is provided for the second pair of wheels 12. This brake beam includes a brake beam cross member 40, a pair of arms 42 and a medial strut 44. Portions of this brake beam are selectively brought into frictional engagement with the second pair of wheels similar to the first brake beam 16, described hereinbefore. A truck dead lever 46 is medially pinned to the strut 44 by means of pin 48. One end of the truck dead lever is pivotally attached to the yoke 32 of the first end of the stack adjuster 30 as at 50, and the other end of the truck dead lever is pivotally attached to a link 52 as by pin 54. The link 52 is loosely attached to fixed support member 56 by passing through the slot 58 (FIG. 7), provided for the purpose.

As best seen in FIG. 1, the slack adjusting device 30 includes a housing 68 having a first end indicated generally at 70 and a second end indicated generally at 72.

A push rod assembly indicated generally at 74 has a threaded portion 76, FIG. 2, a coupling portion 78, FIG. 3, as well as a yoke portion 32, FIG. 5. All of these portions are fixedly interconnected one with respect to the next adjacent one, as shown, the threaded portion and the coupling portion being disposed within the housing and the yoke portion extending from the first end of the housing. The coupling portion 78 of the push rod assembly is mounted in the housing 68 by means of an end bushing 79, FIGS. 1 and 4, held by cap screws 81. The coupling portion has a shoulder 80, FIG. 1. The housing 68 is provided with a combination bearing sleeve and internal circumferential shoulder 82, and a spring 85 is disposed within the housing and acts between the shoulders 80 and 82 urging the threaded portion 76 toward the first end of the housing, or to the right as viewed in FIG. 1.

An adjusting nut 84 is threadably connected to the threaded portions of the push rod and is provided with teeth 86 on the circumference thereof. The adjusting nut is mounted in the housing 68 on bearings 88 which are retained in axial position by the bearing sleeve 82 and a bearing retainer 90, spring means 92 being employed as shown for urging the adjusting nut to the right as viewed in FIG. 1. It will be appreciated that the adjusting nut 84 is movable toward the second end of the housing when an axial force is exerted thereon in the direction from the first end of the housing towards the second end of the housing, and the bearing sleeve 90 serves to limit such axial travel.

As best seen in FIGS. 1–5, the housing has an upper bubble-like protrusion or pawl box 94 for encasing the case and pawl mechanism. A load pawl 96, FIG. 2, and a holding pawl 98 are pivotally mounted on axles 97 and 99, respectively, in the housing adjacent the teeth 86 and engageable respectively with opposite sides of the teeth for preventing movement of the push rod assembly 74 in opposite directions, the load pawl 96 is provided with a cam engaging surface 100 and the holding pawl is provided with a cam engaging surface 102. A cam bar 104 is longitudinally movably mounted on the abutments 106 (FIG. 1) within the housing.

As best seen in FIG. 6, the cam bar 104 is provided with a cam surface 101 and a cam surface 103, cam surface 101 being adapted to engage cam engaging surface 100 of pawl 96 (FIG. 2) and cam surface 103 being adapted to engage cam engaging surface 102 of holding pawl 98 for purposes of actuating the pawls respectively.

A cam bar hub 108 (FIG. 1) is fixedly attached to the cam bar by means of pin 110 provided for the purpose. The cam bar hub is provided with a circumferential shoulder 112, FIG. 1, one side of which engages the abutment 106 to limit the travel of the cam bar in one direction.

Still referring to FIG. 1, one end of a trigger cable 114 is attached to the cam bar hub 108 as at 116. The pawl box 94 is provided with an end flange 118 having an opening therein through which the trigger cable passes. Outside the pawl box, the cable is covered and protected by a cable casing 120, and a cable casing coupling 122 connects the cable casing to the pawl box so that the trigger cable itself is free to move with respect to the cable casing for actuating the cam bar. A spring 124 acts between one side of the shoulder 112 and the end flange 118 to urge the cam bar hub towards the second end of the housing 68 or to the left as viewed in FIG. 1.

As best seen in FIGS. 7 and 8, the other end of the trigger cable casing 120 passes around in an arc and is connected to the frame 121 as by means of cable casing coupling 125. This coupling restricts movement of the cable casing and allows movement of the cable itself. The end of the cable is connected to a bracket 126 mounted on the truck live lever 24 so that movement of the truck live lever causes the trigger cable to move the cam bar 104, accordingly.

In operation when the brakes are released, that is, when the actuating rod 14 is in its right hand position, as viewed in FIGS. 7 and 8, the load pawl 96 (FIG. 2) is in its disengaged position and the holding pawl 98 is in its engaged position. In order to apply the brakes, the actuating rod 14 is moved to the left, as viewed in FIGS. 7 and 8. As the brakes are applied, and hence as the actuating rod 14 moves to the left as viewed in FIGS. 7 and 8, the cable 114 is moved to the left as viewed in FIGS. 7 and 8, and to the right as viewed in FIG. 1 with respect to the housing 68, thereby compressing the spring 124 and causing the cam bar 104 to move to the right as viewed in FIG. 1. At an intermediate stage in the application of the brakes, the cam bar 104 (FIG. 1) will have moved to the right, as viewed in FIG. 1 to a position wherein the cam surfaces 101 and 103 both will be engaging cam engaging surfaces 100 and 102 of pawls 96 and 98, respectively, and thereby lift the pawls 96 and 98 out of engagement with the teeth of the adjusting nut 84. At this time, namely, when both pawls are disengaged from the adjusting nut 84, if there is slack in the brake riggings, the push rod assembly 74 will move to the right with respect to the housing 68 under the pressure of the spring 85, FIG. 1, the nut 84 being free to rotate within the housing, thereby lengthening the overall length of the slack adjusting device to pick up the slack in the rigging. When the brakes are still further applied, and hence when the actuating rod 14, FIGS. 7 and 8, moves further to the left, the trigger cable 114, FIG. 1, moves the cam bar 104 further to the right. In this position, the cam surface 103, while engaging the cam engaging surface 102 of the holding pawl 98, disengages the holding pawl 98 from the teeth 86 of the adjusting nut 84. The cam surface 101, acting through the cam engaging surface 100 will lower the load pawl 96, allowing the load pawl 96 to rotate slightly in a clockwise direction due to the force of the spring 105 so that the load pawl 96 will engage the teeth 86 of the adjusting nut 84, and hence the adjusting nut 84 will be locked in position. When a fuller load is imposed on the unit, the piston assembly moves the nut 84 and its bearings 88 to the left with respect to the housing 68 (as viewed in FIG. 1), compressing the spring 92 until the abutment 91 comes into contact with the left end of the adjusting nut 84, thereby locking the adjusting device in a rigid position for braking. In the brake setting position, the forces imposed by the brake operation follow a course extending through the tubular housing 68, bearing retainer 90, adjusting nut 84, threaded portion 76 to the remainder of the push rod assembly 74. Thus, the braking forces imposed extend from the actuating rod 14, through the truck live lever 24, which urges the brake beam 16 outwardly as viewed in FIGS. 7 and 8 to apply the brakes while the slack adjuster is urged to the right. This tends to pivot the truck dead lever 46 and thereby urges the brake beam 38 outwardly to apply the second set of brakes. Accordingly, it is seen that during the braking operation the slack adjuster is under compression.

When then brakes are released, the cycle of operation described above is repeated in the reverse order so that the parts return to their original positions. That is, the load pawl 96 becomes disengaged from the teeth 86 of the adjusting nut 84, and the holding pawl 98 becomes engaged with the teeth 86 of the adjusting nut 84.

After the brake shoes have been replaced because they were worn out, and the actuating rod 14 has been moved to the left, as viewed in FIGS. 7 and 8, to urge the brake shoes (not shown) against the wheels before the slack is taken out of the trigger cable 114 (before the trigger cable moves the cam bar), and since the holding pawl 98 is in engagement with the teeth 86 of the adjusting nut 84, and the load pawl 96 is disengaged from the same adjusting nut teeth, the force supplied to the push rod assembly 74 pushes the threaded portion 76 thereof to the left as viewed in FIG. 1, while at the same time compressing spring 85. This causes the adjusting nut 84 to rotate in a counter-clockwise direction as viewed in FIG. 2, thereby ratcheting under the pawl 98, which is free to rotate outwardly away from the teeth at all times, against the smaller force of the spring 105. This action takes place until the trigger cable 114 takes up slack and moves the cam bar 104 sufficiently to the right as viewed in FIG. 1 to seat the load pawl 96 in the teeth 86 of the nut 84, thereby locking the adjusting nut in its brake setting position, and the brakes are applied in the manner aforementioned.

Figure 12:
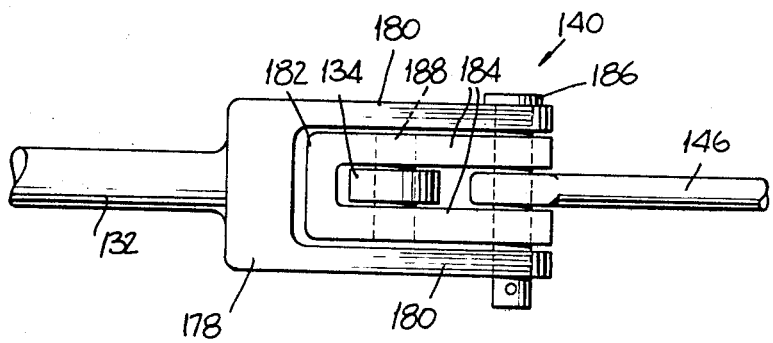
FIG. 12 is an enlarged view of the double clevis arrangement of the embodiment of FIG. 11.

In another form of the invention, as best seen in FIGS. 11 and 12, the brake mechanism comprises a frame 128, an air cylinder and piston assembly 130 mounted on the frame, and a piston rod 132 extending from the cylinder. A substantially horizontally disposed first lever 134 is centrally pivotally mounted on the support member 136 as by means of pin 138, the support member 136 being fixedly mounted on the frame 128. One end of the first lever 134 is pivotally attached to the piston rod 132 as by means of a double clevis assembly indicated generally at 140, and the other end thereof is connected to one end of a truck live lever 142 as by means of shackle 144. A handbrake rod 146 is also connected to the double clevis assembly 140, as shown in FIGS. 11 and 12, for purposes of operating the brakes by hand. The other end of the truck live lever is pivotally attached to a first brake beam 148 (FIG. 11) as by means of pin 151, brake beam 148 being constructed and operated in a manner similar to that described hereinbefore in connection with brake beam 16 of FIGS. 7 and 8.

As best seen in FIG. 12, the double clevis assembly 140 includes a yoke 178 on the end of the piston rod. The yoke is provided with a pair of spaced arms 180 opening to the right as viewed in FIG. 12. A U-shaped member 182 is mounted between the arms 180 of the yoke. This member has a pair of spaced fingers 184 also opening to the right as viewed in FIG. 12. A first pin 186 extends through both arms 180 and both fingers 184 to pivotally interconnect the yoke 178 and the U-shaped member 182. A second pin 188 serves to pivotally interconnect one end of the live lever 134 between the fingers 184 of the U-shaped member. The handbrake rod 146 is also pivotally mounted on the first pin 186, as shown. It will be particularly appreciated that the use of this new and improved double clevis assembly overcomes side thrust loadings on the piston rod 132 due to the swing of the live lever 134.

Still referring to the embodiment of FIGS. 11 and 12, the truck live lever 142 is centrally pivotally mounted on one end of a slack adjuster 150, as by means of pin 152 provided for the purpose. Slack adjuster 150 is constructed and operates the same as slack adjuster 30 described hereinbefore. However, it is noted that slack adjuster 150 passes through the frame or bolster 128 (FIG. 11) whereas slack adjuster 30 passes under the frame or bolster 121 (FIG. 7).

As seen in FIG. 11, a truck dead lever 154 is medially pivotally attached to the other end of the slack adjuster 150 as by means of pin 156. A support 158 is fixedly attached to the frame 128 and one end of the truck dead lever 154 is connected thereto by means of shackle 160, and the other end of the truck dead lever 154 is pivotally connected to a second brake beam 162 as by means of pin 164. The second brake beam is constructed and operates like the brake beam 148 described hereinbefore.

A trigger cable 166 (FIG. 11) is provided for purposes of actuating the slack adjuster 150. One end of this cable is connected to bracket 168 mounted on the horizontal live lever 134, and the other end of the cable is connected to the slack adjuster as at 170. A coupling member 172 connects the trigger cable casing 174 to the frame 128 and coupling member 176 connects the casing to the slack adjuster 150.

In operation the slack is removed from the brake rigging in the same manner as that described in connection with the embodiment of FIGS. 7, 8, 9 and 10. After the brakes have been applied and the slack adjuster 150 is in its rigid position, the brake forces imposed extend from the piston rod 132, through the double clevis assembly 140, through the first lever 134, through the truck live lever 142 which urges the slack adjuster 150 to the left as viewed in FIG. 11 and urges the brake beam 148 to the right as viewed in FIG. 11 to apply the brakes. This movement of the slack adjuster urges the truck dead lever 154 to pivot about its support 158 and move the second brake beam 162 to the left as viewed in FIG. 11, thereby applying the second pair of brakes. It is again seen that during brake operation the slack adjuster is under compression.

When the brakes are released, the cycle of operation described above is repeated in the reverse order so that the parts return to their original positions.

In still another form of the invention, as best seen in FIGS. 13, 14, 15 and 16, the brake mechanism comprises a frame 190, an air cylinder and piston assembly 192 (FIG. 14) mounted on the frame, and a piston rod 194 extending from the cylinder. One end of a substantially horizontally disposed first lever 196 is pivotally mounted on a support member 198 as by means of pin 200, the support member being fixedly mounted on the frame 190. The other end of the first lever 196 is pivotally attached to the piston rod 194 as at 202 and the medial portion thereof is connected to one end of a truck live lever 204 as by means of shackle 205. The medial portion of the truck live lever 204 is pivotally attached to a first brake beam 207 as by means of pin 209, brake beam 207 being constructed and operated in a manner similar to that described hereinbefore in connection with brake beam 16 of FIGS. 7 and 8.

Still referring to the embodiment of FIGS. 13, 14, 15 and 16, the other end of the truck live lever 204 is pivotally mounted on one end of a slack adjuster 206, as by means of pin 208 provided for the purpose. Slack adjuster 206 is constructed and operates the same as slack adjuster 30 described hereinbefore.

As best seen in FIG. 14, one end of a truck dead lever 210 is pivotally attached to the other end of the slack adjuster 206 as by means of pin 212. A support 214 is attached to the frame 190 and one end of the truck dead lever 210 is connected thereto by means of link member 216 and the medial portion of the truck dead lever 210 is pivotally connected to a second brake beam 218 as by means of pin 220. The second brake beam 218 is constructed and operates like the brake beam 207 described hereinbefore.

A trigger cable 222 is provided for purposes of actuating the slack adjuster 206. One end of this cable is connected to bracket 224 mounted on the piston rod 194, and the other end of the cable is connected to the slack adjuster as at 226 (FIG. 13). A coupling member 228 connects the trigger cable casing 230 to the frame 190 and coupling member 232 connects the casing to the slack adjuster 206.

In operation the slack is removed from the brake rigging in the same manner as that described in connection with the embodiment of FIGS. 7 and 8. After the brakes have been applied and the slack adjuster 206 is in its rigid position, the brake forces imposed extend from the piston rod 194, through the first lever 196, through the truck live lever 204 which urges the slack adjuster 206 to the right as viewed in FIG. 14 and urges the brake beam 207 to the left as viewed in FIG. 14 to apply the brakes. This movement of the slack adjuster urges the truck dead lever 210 to pivot about its support 216 and move the second brake beam 218 to the right as viewed in FIG. 14 thereby applying the second pair of brakes. It is again seen that during brake operation the slack adjuster is under compression.

When the brakes are released, the cycle of operation described above is repeated in the reverse order so that the parts return to their original positions.

It will be appreciated that the slack adjusters 30, 150 and 206 are, in effect, double acting devices and serve to maintain the travel of the piston rods 132 (FIG. 11) and 194 (FIG. 14) and actuating rod 14 (FIGS. 8 and 9) at preselected amounts automatically, respectively, and hence the braking forces are uniformly applied in each car of a series of cars. Thus, the possibility of some cars being held back while other cars roll ahead is substantially eliminated.

In view of the foregoing description, taken in conjunction with the accompanying drawings, it is believed that a clear understanding of the construction, operation and advantages of the device will be quite apparent to those skilled in the art. A more detailed description is accordingly deemed unnecessary.

It is to be understood, however, that even though I have herein shown and described several preferred embodiments of the invention, the same are susceptible to certain changes fully comprehended by the spirit of the invention as herein described.

Having thus described the invention, what I claim is:

1. A brake mechanism for a railway car having a body and a truck carrying a pair of wheels, said mechanism comprising a brake beam having portions which are selectively brought into frictional engagement with said pair of wheels, a truck lever medially pivotally mounted on said brake beam, slack adjusting means, said slack adjusting means being extensible and retractable for eliminating the slack and controlling the travel of the brake mechanism, said slack adjusting means being lockable in a rigid condition when transmitting the full braking force to said brake beam, one end of said truck lever being pivotally connected to the slack adjusting means, an actuating rod being pivotally attached to the other end of said truck lever, and trigger means interconnecting said truck lever and said slack adjusting means for actuating said slack adjusting means in response to movement of said truck lever, a second pair of wheels, said truck live lever being centrally pivotally mounted on said brake beam, said slack adjusting means having a first end and a second end, one end of said truck live lever being pivotally connected to said actuating rod and the other end of the truck live lever being pivotally connected to the second end of the slack adjusting means, said mechanism further comprising a second brake beam having portions which are selectively brought into frictional engagement with said second pair of wheels, a truck dead lever centrally pivotally mounted on said second brake beam, said truck dead lever having one end pivotally connected to the first end of said slack adjusting means, a link pivotally attached to said frame member, and the other end of said truck dead lever being pivotally connected to said link, said slack adjusting device comprising a housing having first and second ends; a push rod assembly having a threaded portion, a coupling portion having a circumferential shoulder and a yoke portion, said portions being fixedly interconnected one with respect to the next adjacent one, and said threaded portion and said coupling portion being disposed within said housing and said yoke portion extending from said first end of the housing, said housing having an internal circumferential shoulder; spring means disposed within the housing and acting between the housing shoulder and the coupling portion shoulder of said push rod assembly for urging said threaded portion toward said first end of the housing; an adjusting nut threadably mounted on the threaded portion of said push rod and being provided with teeth on the circumference thereof; bearing means mounting said adjusting nut within the housing for rotation; bearing retainer means for said bearing means, resilient means for resiliently separating said adjusting nut and said retainer means, said adjusting nut engaging said bearing retainer means when an axial force is applied, in opposition to said resilient means, to said slack adjusting means and it is in its rigid condition, means for limiting the axial travel of said adjusting nut with respect to the housing, a load pawl and a holding pawl mounted in said housing adjacent said teeth and engageable respectively with opposite sides of the teeth for respectively preventing movement of said push rod assembly in opposite directions; means engaging said pawls for moving said pawls into engagement with said teeth, a cam bar longitudinally movably mounted within the housing, a cam bar hub for engaging an abutment disposed within the housing for preventing excessive movement in a direction away from said one end of said housing, said cam bar hub being pinned to said cam bar, said cam bar hub having a circumferential shoulder, said other end of the trigger cable being threadably connected to said cam bar hub, said cable extending through an opening in the end of the housing and being adapted for longitudinal movement with respect to said housing, an end flange mounted on said housing adjacent said opening, a cable casing protecting said cable outside of said housing, a cable casing coupling attaching said cable casing to said end flange adjacent said opening, and spring means disposed within the housing and acting between the cam bar hub shoulder and the end flange for urging the cam bar hub toward the second end of said housing.

2. In a brake mechanism for a railway car of the class described, the combination comprising an air cylinder and piston assembly, a piston rod extending from said piston assembly, a U-shaped yoke mounted on the end of said piston rod, said yoke having a pair of spaced arms opening in a first direction, a U-shaped member mounted between the arms of said yoke, said member having a pair of spaced fingers opening in said first direction, a first pin extending with a loose fit through one of said arms, one of said fingers, the other of said fingers and the other of said arms, said pin being disposed towards the extremity of said arms and fingers in said first direction, a live lever for actuating brake means in said railway car, said live lever having an O-shaped yoke at one end thereof, a second pin extending with a loose fit through one of said fingers, said O-shaped yoke, and the other of said fingers, said second pin being disposed with respect to said first pin in an opposite direction with respect to said first direction.

3. A brake mechanism for a railway car according to claim 2 further comprising a hand brake rod having an O-shaped yoke at one end thereof, and wherein said first pin extends with a loose fit through one of said arms, one of said fingers, said O-shaped yoke on said hand brake rod, the other of said fingers and the other of said arms.

4. A brake mechanism for a railway car having a truck carrying a pair of wheels, said mechanism comprising a frame member, a piston cylinder assembly mounted on said frame member, a piston rod actuated by said piston cylinder assembly, a yoke mounted on the end of said piston rod, said yoke having a pair of spaced arms opening in a first direction, a U-shaped member mounted between the arms of said yoke, said member having a pair of spaced fingers and opening in said first direction, first pin means pivotally interconnecting said arms and said fingers, a first lever centrally pivotally mounted on said frame member, second pin means pivotally interconnecting one end of said first lever between the fingers of said U-shaped member, a brake beam having portions which are selectively brought into frictional engagement with said pair of wheels, a truck live lever having one end pivotally mounted on said brake beam, slack adjusting means, said slack adjusting means being extensible and retractable for eliminating the slack and controlling the travel of the brake mechanism, said slack adjusting means being lockable in a rigid condition when transmitting the full braking force to said brake beam, said truck lever having the other end operatively connected to the other end of said first lever and being centrally pivotally connected to the slack adjusting means, and a trigger cable having one end attached to said first lever and the other end attached to said slack adjusting means for actuating said slack adjusting means in response to movement of said first lever.

5. A brake mechanism for a railway car according to claim 4 further comprising a second pair of wheels, and wherein one end of said truck live lever is pivotally mounted on said brake beam, said slack adjusting means having a first end and a second end, shackle means connecting the other end of said truck live lever to said first mentioned live lever, and the truck live lever being centrally pivotally connected to the second end of the slack adjusting means, said mechanism further comprising a second brake beam having portions which are selectively brought into frictional engagement with said second pair of wheels, a truck dead lever centrally pivotally mounted on the first end of the slack adjusting means, said truck dead lever having one end pivotally connected to the second brake beam, and shackle means for connecting the other end thereof to said frame member, and wherein said slack adjusting device comprises a housing having first and second ends; a push rod assembly having a threaded portion, a coupling portion having a circumferential shoulder and a yoke portion, said portions being fixedly interconnected one with respect to the next adjacent one, and said threaded portion and said coupling portion being disposed within said housing and said yoke portion extending from said first end of the housing, said housing having an internal circumferential shoulder; spring means disposed within the housing and acting between the housing shoulder and the coupling portion shoulder of said push rod assembly for urging said threaded portion towards said first end of the housing; an adjusting nut threadably mounted on the threaded portion of said push rod and being provided with teeth on the circumference thereof; bearing means mounting said adjusting nut within the housing for rotation, bearing retainer means for said bearing means, resilient means for resiliently separating said adjusting nut and said retainer means, said adjusting nut engaging said bearing retainer means when an axial force is applied, in opposition to said resilient means, to said slack adjusting means and it is in its rigid condition, means for limiting the axial travel of said adjusting nut with respect to the housing, a load pawl and a holding pawl mounted in said housing adjacent said teeth and engageable respectively with opposite sides of the teeth for respectively preventing movement of said push rod assembly in opposite directions; means engaging said pawls for moving said pawls into engagement with said teeth, a cam bar longitudinally movably mounted within the housing, a cam bar hub for engaging an abutment disposed within the housing for preventing excessive movement in the direction away from said one end of said housing, said cam bar hub being pinned to said cam bar, said cam bar hub having a circumferential shoulder, said other end of the trigger cable being threadably connected to said cam bar hub, said cable extending to an opening in the end of the housing and being adapted for longitudinal movement with respect to said housing, an end flange mounted on said housing adjacent said opening, a cable casing protecting said cable outside of said housing, a cable casing coupling attaching said cable casing to said end flange adjacent said opening, and resilient means disposed within the housing and acting between the cam bar hub shoulder and the end flange for urging the cam bar hub towards the second end of said housing.

6. A brake mechanism for a railway car having a truck carrying a pair of wheels, said mechanism comprising a frame member, a piston cylinder assembly mounted on said frame member, a piston rod actuated by said piston cylinder assembly, a first lever having one end pivotally mounted on said frame member and having the other end pivotally mounted on said piston rod, a brake beam having portions which are selectively brought into frictional engagement with said pair of wheels, a truck live lever medially pivotally mounted on said brake beam, slack adjusting means, said slack adjusting means being extensible and retractable for eliminating the slack and controlling the travel of the brake mechanism, said slack adjusting means being lockable in a rigid condition when transmitting the full braking force to said brake beam, said truck lever having one end operatively connected to the medial portion of said first lever and the other end being pivotally connected to the slack adjusting means, and a trigger cable having one end attached to said piston rod and the other end attached to said slack adjusting means for actuating said slack adjusting means in response to movement of said piston rod.

7. A brake mechanism for a railway car according to claim 6 further comprising a second pair of wheels, a second brake beam having portions which are selectively brought into frictional engagement with said second pair of wheels, said slack adjusting means operatively connecting said first brake beam with said second brake beam.

8. A brake mechanism for a railway car according to claim 6 further comprising a second pair of wheels, and wherein the medial portion of said truck live lever is pivotally mounted on said brake beam, said slack adjusting means having a first end and a second end, shackle means connecting said one end of said truck live lever to said first lever and the other end of said truck live lever being connected to the second end of the slack adjusting means, said mechanism further comprising a second brake beam having portions which are selectively brought into frictional engagement with said second pair of wheels, a truck dead lever having one end pivotally mounted on the first end of the slack adjusting means, said truck dead lever being medially pivotally mounted on the second brake beam, and a link member for connecting the other end of the truck dead lever to said frame member.

9. A brake mechanism for a railway car according to claim 6 further comprising a second pair of wheels, a second brake beam having portions which are selectively brought into frictional engagement with said second pair of wheels, said slack adjusting means operatively connecting said first brake beam with said second brake beam, and wherein said slack adjusting device comprises a housing having first and second ends, a push rod assembly having a threaded portion, an adjusting nut threadably mounted on said threaded portion of the push rod and being provided with teeth on the circumference thereof; means mounting said adjusting nut within the housing for rotation, resilient means for resiliently separating said adjusting nut and said retainer means, said adjusting nut engaging said bearing retainer means when an axial force is applied, in opposition to said resilient means, to said slack adjusting means and it is in its rigid condition, a load pawl and a holding pawl mounted in said housing adjacent said teeth and engageable respectively with opposite sides of the teeth for respectively preventing movement of said push rod assembly in opposite directions, means engaging said pawls for moving said pawls into engagement with said teeth, a cam bar longitudinally movably mounted within the housing, the cam bar having cam surfaces engageable with said pawls respectively for disengaging said teeth engaging portions of said pawls from said teeth, said cam surfaces and said cam engaging portions being disposed with respect to said pawls so that in a first longitudinal position of the cam bar said load pawl is out of engagement with said teeth and said holding pawl is in engagement with one of said teeth, in a second longitudinal position of the cam bar said load pawl is in engagement with one of said teeth and said holding pawl is out of engagement with said teeth; and wherein said other end of said trigger cable is connected to said cam bar.

10. A brake mechanism for a railway car according to claim 6 further comprising a second pair of wheels, and wherein the medial portion of said truck live lever is pivotally mounted on said brake beam, said slack adjusting means having a first end and a second end, shackle means connecting said one end of said truck live lever to said first lever, and the other end of said truck live lever being connected to the second end of the slack adjusting means, said mechanism further comprising a second brake beam having portions which are selectively brought into frictional engagement with said second pair of wheels, a truck dead lever having one end pivotally mounted on the first end of the slack adjusting means, said truck dead lever being medially pivotally mounted on the second brake beam, and a link member for connecting the other end of the truck dead lever to said frame member, and wherein said slack adjusting device comprises a housing having first and second ends; a push rod assembly having a threaded portion, a coupling portion having a circumferential shoulder and a yoke portion, said portions being fixedly interconnected one with respect to the next adjacent one, and said threaded portion and said coupling portion being disposed within said housing and said yoke portion extending from said first end of the housing, said housing having an internal circumferential shoulder; spring means disposed within the housing and acting between the housing shoulder and the coupling portion shoulder of said push rod assembly for urging said threaded portion towards said first end of the housing; an adjusting nut threadably mounted on the threaded portion of said push rod and being provided with teeth on the circumference thereof; bearing means mounting said adjusting nut within the housing for rotation, bearing retainer means for said bearing means, resilient means for resiliently separating said adjusting nut and said retainer means, said adjusting nut engaging said bearing retainer means when an axial force is applied, in opposition to said resilient means, to said slack adjusting means and it is in its rigid condition, means for limiting the axial travel of said adjusting nut with respect to the housing, a load pawl and a holding pawl mounted in said housing adjacent said teeth and engageable respectively with opposite sides of the teeth for respectively preventing movement of said push rod assembly in opposite directions; means engaging said pawls for moving said pawls into engagement with said teeth, a cam bar longitudinally movably mounted within the housing, a cam bar hub for engaging an abutment disposed within the housing for preventing excessive movement in the direction away from said one end of said housing, said cam bar hub being pinned to said cam bar, said cam bar hub having a circumferential shoulder, said other end of the trigger cable being threadably connected to said cam bar hub, said cable extending to an opening in the end of the housing and being adapted for longitudinal movement with respect to said housing, an end flange mounted on said housing adjacent said opening, a cable casing protecting said cable outside of said housing, a cable casing coupling attaching said cable casing to said end flange adjacent said opening, and resilient means disposed within the housing and acting between the cam bar hub shoulder and the end flange for urging the cam bar hub towards the second end of said housing.

References Cited

UNITED STATES PATENTS

| 1,474,093 | 11/1923 | Sauvage | 188—199 |
| 1,798,436 | 3/1931 | Sauvage | 188—200 |
| 3,283,861 | 11/1966 | Mersereau | 188—202 |
| 3,298,475 | 1/1967 | Mersereau et al. | 188—200 |

DUANE A. REGER, *Primary Examiner.*

U.S. Cl. X.R.

188—52